(12) United States Patent
Zhang

(10) Patent No.: US 10,305,806 B2
(45) Date of Patent: May 28, 2019

(54) DATA PACKET TRANSMISSION METHOD AND BORDER ROUTING BRIDGE DEVICE

(71) Applicant: Huawei Technologies Co., Ltd., Shenzhen (CN)

(72) Inventor: Mingui Zhang, Beijing (CN)

(73) Assignee: HUAWEI TECHNOLOGIES., LTD., Shenzhen (CN)

( * ) Notice: Subject to any disclaimer, the term of this patent is extended or adjusted under 35 U.S.C. 154(b) by 62 days.

(21) Appl. No.: 15/699,519

(22) Filed: Sep. 8, 2017

(65) Prior Publication Data

US 2018/0013679 A1 Jan. 11, 2018

Related U.S. Application Data

(63) Continuation of application No. PCT/CN2016/075490, filed on Mar. 3, 2016.

(30) Foreign Application Priority Data

Mar. 9, 2015 (CN) .......................... 2015 1 0102617

(51) Int. Cl.
*H04L 12/803* (2013.01)
*H04L 12/46* (2006.01)
(Continued)

(52) U.S. Cl.
CPC .......... *H04L 47/125* (2013.01); *H04L 12/462* (2013.01); *H04L 45/04* (2013.01);
(Continued)

(58) Field of Classification Search
None
See application file for complete search history.

(56) References Cited

U.S. PATENT DOCUMENTS

2011/0299534 A1* 12/2011 Koganti .............. H04L 12/4625 370/392
2014/0101336 A1* 4/2014 Yang ...................... H04L 45/02 709/244
(Continued)

FOREIGN PATENT DOCUMENTS

CN 102244614 A 11/2011
CN 102368727 A 3/2012
(Continued)

OTHER PUBLICATIONS

Machine Translation and Abstract of Chinese Publication No. CN102244614, dated Nov. 16, 2011, 28 pages.
(Continued)

*Primary Examiner* — Rebecca E Song
(74) *Attorney, Agent, or Firm* — Conley Rose P.C.

(57) ABSTRACT

A data packet transmission method and a border routing bridge device, where the method includes receiving, by a first border routing bridge device of a first area, a first data packet sent by a border routing bridge device of a second area to the first area, determining, a device identifier group of the second area according to the first data packet, determining, from the device identifier group of the second area, according to the first data packet, a device identifier of a border routing bridge device used to forward a return data packet sent by the target device to the source device, and sending, by the first border routing bridge device, a second data packet carrying the determined device identifier to the target device, where the determined device identifier is used as a source routing bridge device identifier of the second data packet.

20 Claims, 5 Drawing Sheets

(51) Int. Cl.
*H04L 12/705* (2013.01)
*H04L 12/707* (2013.01)
*H04L 12/743* (2013.01)
*H04L 12/715* (2013.01)

(52) U.S. Cl.
CPC .............. *H04L 45/18* (2013.01); *H04L 45/24* (2013.01); *H04L 45/7453* (2013.01)

(56) References Cited

U.S. PATENT DOCUMENTS

| | | |
|---|---|---|
| 2014/0146710 A1 | 5/2014 | Yang |
| 2014/0254374 A1 | 9/2014 | Janakiraman et al. |
| 2015/0139233 A1* | 5/2015 | Zhai .................... H04L 12/4641 370/392 |

FOREIGN PATENT DOCUMENTS

| | | |
|---|---|---|
| CN | 102684985 A | 9/2012 |
| CN | 104038357 A | 9/2014 |
| EP | 1830523 A1 | 9/2007 |
| EP | 2282453 A1 | 2/2011 |
| EP | 2493122 A1 | 8/2012 |

OTHER PUBLICATIONS

Machine Translation and Abstract of Chinese Publication No. CN102684985, dated Sep. 19, 2012, 27 pages.
Zhang, M., et al., "Single Area Border RBridge Nickname for Trill Multilevel," draft-ietf-trill-multilevel-single-nickname-00.bd, Aug. 20, 2015, 11 pages.
Foreign Communication From A Counterpart Application, PCT Application No. PCT/CN2016/075490, English Translation of International Search Report dated May 24, 2016, 2 pages.
Foreign Communication From A Counterpart Application, PCT Application No. PCT/CN2016/075490, English Translation of Written Opinion dated May 24, 2016, 7 pages.
Machine Translation and Abstract of Chinese Publication No. CN104038357, dated Sep. 10, 2014, 20 pages.
Machine Translation and Abstract of European Publication No. EP2493122, dated Aug. 29, 2012, 13 pages.
Foreign Communication From A Counterpart Application, European Application No. 16761073.2, Extended European Search Report dated Feb. 1, 2018, 7 pages.

* cited by examiner

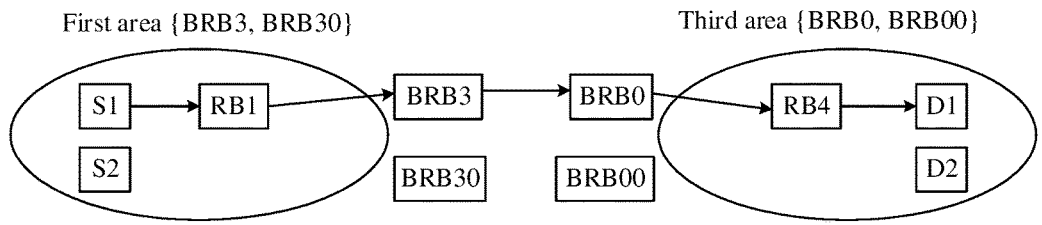

FIG. 4A

| When a first border routing bridge device of a first area sends a first data packet to a border routing bridge device of a third area, the first border routing bridge device determines a device identifier group of the third area according to the first data packet | ～ S401 |

↓

| The first border routing bridge device determines a device identifier of a target border routing bridge device of the third area from the device identifier group of the third area according to the first data packet | ～ S402 |

↓

| The first border routing bridge device sends a second data packet that carries the device identifier of the target border routing bridge device to the target border routing bridge device, where the device identifier of the target border routing bridge device is used as a target routing bridge device identifier of the second data packet | ～ S403 |

FIG. 4B

DATA PACKET TRANSMISSION METHOD AND BORDER ROUTING BRIDGE DEVICE

CROSS-REFERENCE TO RELATED APPLICATIONS

This application is a continuation of International Patent Application No. PCT/CN2016/075490 filed on Mar. 3, 2016, which claims priority to Chinese Patent Application No. 201510102617.9 filed on Mar. 9, 2015. The disclosures of the aforementioned applications are hereby incorporated by reference in their entireties.

TECHNICAL FIELD

Embodiments of the present disclosure relate to the communications technologies, and in particular, to a data packet transmission method and a border routing bridge device.

BACKGROUND

The Spanning Tree Protocol (STP) is widely used on a data forwarding layer of the Ethernet. As a network protection technology, the STP is used to generate a tree, to prevent a network loopback on a local area network, and resolve a "broadcast storm" problem on an Ethernet network on which a loop occurs. The STP is a data-link-layer (layer 2) communications protocol that is based on an open system interconnection reference model (OSI). However, because the STP blocks some ports to prevent a loop, that is, does not allow multipath routing, all data packets are transmitted in one tree (that is, the data packets are transmitted along a non-optimal path), and even if there is an idle link, the idle link cannot be used. Consequently, bandwidth cannot be fully utilized.

To eliminate the defect of the STP, the Internet Engineering Task Force (IETF) puts forward the Transparent Interconnection of Lots of Links (TRILL) protocol. In the TRILL protocol, the Intermediate System to Intermediate System Routing Protocol (IS-IS) of layer 3 is introduced in layer 2 to replace the STP, to allow multipath routing and allow data packet transmission along a shortest path such that bandwidth can be utilized more fully. A device running the TRILL protocol is referred to as a TRILL switch or routing bridge. In the TRILL protocol, fields such as an identifier (nickname), a virtual local area network (VLAN), and a Media Access Control (MAC) address are encapsulated in a data packet. The nickname is a device identifier of a TRILL switch, and the MAC address is a device identifier of a source device or a target device. To resolve a scalability problem of a TRILL network, the TRILL network is divided into multiple areas. The areas are connected to and communicate with each other using border routing bridge devices. That is, all routing bridges inside one area form a level 1 (L1) network, and the areas are interconnected to form a level 2 (L2) network.

In an existing multi-level TRILL network solution, for an L1 area, an aggregate nickname is used to represent an L1 area (pseudonode), and the pseudonode is regarded as a routing bridge on an L2 network. FIG. 1A is a schematic diagram of a multilevel TRILL network on which an aggregate nickname is used. FIG. 1B is a topological diagram of the network shown in FIG. 1A on an L2 network. As shown in FIG. 1A, an aggregate nickname 15961 is used to represent a left area, and an aggregate nickname 15918 is used to represent a right area. A network topology of the network shown in FIG. 1A on the L2 network is shown in FIG. 1B.

RB1 and RB4 shown in FIG. 1A are routing bridge devices on the L1 network. As shown in FIG. 1A and FIG. 1B, RBb, RBc, RBd, RBe, RBf, RBg, RBh, RBi, and RBj are routing bridge devices on the L2 network. BRB2 and BRB20 are border routing bridge devices in the left area, and BRB3 and BRB30 are border routing bridge devices in the right area. BRB2, BRB20, BRB3, and BRB30 belong to both the L1 network and the L2 network. When a source device S sends a data packet to a target device D and the data packet passes through BRB2, BRB2 changes a source nickname of the data packet from a nickname 27 of RB1 to the aggregate nickname 15961 of the left area. After receiving the data packet whose source nickname has been changed, RB4 learns that the source device S can be reached using routing bridge 15961. Further, when any data packet needs to return to routing bridge 15961 from routing bridge 15918 (data packet from a nickname 44 of RB4), it is always determined, according to a shortest path algorithm defined in the TRILL, to forward the data packet using BRB2. Consequently, a load imbalance is caused.

SUMMARY

Embodiments of the present disclosure provide a data packet transmission method and a border routing bridge device, to implement per-flow load balancing.

According to a first aspect, an embodiment of the present disclosure provides a data packet transmission method, including receiving, by a first border routing bridge device of a first area, a first data packet sent by a border routing bridge device of a second area to the first area, where the first data packet includes a device identifier of the border routing bridge device of the second area that is used as a source routing bridge device identifier, a device identifier of the first border routing bridge device that is used as a target routing bridge device identifier, a device identifier of a source device, and a device identifier of a target device, determining, by the first border routing bridge device, a device identifier group of the second area according to the first data packet, where the device identifier group of the second area includes device identifiers of all border routing bridge devices of the second area, determining, by the first border routing bridge device, one device identifier from the device identifier group of the second area according to the first data packet, where a border routing bridge device, which is identified by the determined device identifier, of the second area is used to forward a return data packet sent by the target device to the source device, and sending, by the first border routing bridge device, a second data packet that carries the determined device identifier to the target device, where the determined device identifier is used as a source routing bridge device identifier of the second data packet.

With reference to the first aspect, in a first possible implementation manner of the first aspect, determining, by the first border routing bridge device, one device identifier from the device identifier group of the second area according to the first data packet includes setting, by the first border routing bridge device, identifier information included in the first data packet as an input of a hash algorithm, and determining, from the device identifier group of the second area according to the hash algorithm, the device identifier corresponding to the border routing bridge device of the second area and that is used to forward the return data packet sent by the target device to the source device, where the identifier information includes at least one of the device identifier of the border routing bridge device of the second area, the device identifier of the first border routing bridge device, and the device identifier of the source device.

With reference to the first aspect, in a second possible implementation manner of the first aspect, determining, by the first border routing bridge device, one device identifier from the device identifier group of the second area according to the first data packet includes determining, by the first border routing bridge device from the device identifier group of the second area using a shortest path algorithm according to identifier information included in the first data packet, the device identifier corresponding to the border routing bridge device of the second area and that is used to forward the return data packet sent by the target device to the source device, where the identifier information includes at least one of the device identifier of the border routing bridge device of the second area, the device identifier of the first border routing bridge device, the device identifier of the source device, and the device identifier of the target device.

With reference to any one of the first aspect or the first or the second possible implementation manner of the first aspect, in a third possible implementation manner of the first aspect, sending, by the first border routing bridge device, a second data packet that carries the determined device identifier to the target device includes determining, by the first border routing bridge device, that the determined device identifier is different from the device identifier corresponding to the source routing bridge device identifier of the first data packet, and setting, by the first border routing bridge device, the determined device identifier as the source routing bridge device identifier of the second data packet, and sending the second data packet that carries the determined device identifier to the target device.

With reference to any one of the first aspect or the first to the third possible implementation manners of the first aspect, in a fourth possible implementation manner of the first aspect, before determining, by the first border routing bridge device, a device identifier group of the second area according to the first data packet, the method further includes obtaining, by the first border routing bridge device, a device identifier group of at least one area, where the device identifier group of each of the at least one area includes device identifiers of all border routing bridge devices of the area, and the second area is one of the at least one area.

With reference to the fourth possible implementation manner of the first aspect, in a fifth possible implementation manner of the first aspect, obtaining, by the first border routing bridge device, a device identifier group of at least one area includes obtaining, by the first border routing bridge device, the device identifier group of the at least one area according to device identifier group information of each of the at least one area that is sent by a border routing bridge device of the area.

With reference to the fourth or the fifth possible implementation manner of the first aspect, in a sixth possible implementation manner of the first aspect, determining, by the first border routing bridge device, a device identifier group of the second area according to the first data packet includes determining, by the first border routing bridge device, the device identifier group of the second area from the device identifier group of the at least one area according to information about the device identifier of the border routing bridge device of the second area that is included in the first data packet.

With reference to any one of the first aspect or the first to the sixth possible implementation manners of the first aspect, in a seventh possible implementation manner of the first aspect, before determining, by the first border routing bridge device, a device identifier group of the second area according to the first data packet, the method further includes determining, in the first area, by the first border routing bridge device, at least one other border routing bridge device of the first area other than the first border routing bridge device, and forming a device identifier group of the first area according to device identifiers of all border routing bridge devices of the first area, where all the border routing bridge devices of the first area include the first border routing bridge device.

With reference to the seventh possible implementation manner of the first aspect, in an eighth possible implementation manner of the first aspect, determining, in the first area, by the first border routing bridge device, at least one other border routing bridge device of the first area other than the first border routing bridge device includes determining, by the first border routing bridge device, the at least one other border routing bridge device of the first area respectively according to a respective device identifier sent by the at least one other border routing bridge device of the first area.

According to a second aspect, an embodiment of the present disclosure provides a data packet transmission method, including determining, by the first border routing bridge device, a device identifier group of the third area according to the first data packet when a first border routing bridge device of a first area sends a first data packet to a border routing bridge device of a third area, where the first data packet includes a device identifier of the first border routing bridge device that is used as a source routing bridge device identifier, a device identifier of the border routing bridge device of the third area that is used as a target routing bridge device identifier, a device identifier of a source device, and a device identifier of a target device, and the device identifier group of the third area includes device identifiers of all border routing bridge devices of the third area, determining, by the first border routing bridge device, a device identifier of a target border routing bridge device of the third area from the device identifier group of the third area according to the first data packet, where the target border routing bridge device of the third area is used to receive a data packet sent by the first border routing bridge device, and sending, by the first border routing bridge device, a second data packet that carries the device identifier of the target border routing bridge device to the target border routing bridge device, where the device identifier of the target border routing bridge device is used as a target routing bridge device identifier of the second data packet.

With reference to the second aspect, in a first possible implementation manner of the second aspect, determining, by the first border routing bridge device, a device identifier of a target border routing bridge device of the third area from the device identifier group of the third area according to the first data packet includes setting, by the first border routing bridge device, identifier information included in the first data packet as an input of a hash algorithm, and determining the device identifier of the target border routing bridge device of the third area from the device identifier group of the third area according to the hash algorithm, where the identifier information includes at least one of the device identifier of the first border routing bridge device, the device identifier of the border routing bridge device of the third area, the device identifier of the source device, and the device identifier of the target device.

With reference to the second aspect, in a second possible implementation manner of the second aspect, determining, by the first border routing bridge device, a device identifier of a target border routing bridge device of the third area from the device identifier group of the third area according to the first data packet includes determining, by the first border routing bridge device, the device identifier of the target border routing bridge device of the third area from the device identifier group of the third area using a shortest path algorithm according to identifier information included in the first data packet, where the identifier information includes at least one of the device identifier of the first border routing bridge device, the device identifier of the border routing bridge device of the third area, the device identifier of the source device, and the device identifier of the target device.

With reference to any one of the second aspect or the first or the second possible implementation manner of the second aspect, in a third possible implementation manner of the second aspect, sending, by the first border routing bridge device, a second data packet that carries the device identifier of the target border routing bridge device to the target border routing bridge device includes determining, by the first border routing bridge device, that the device identifier of the target border routing bridge device is different from the device identifier corresponding to the target routing bridge device identifier of the first data packet, and setting, by the first border routing bridge device, the device identifier of the target border routing bridge device as the target routing bridge device identifier of the second data packet, and sending the second data packet that carries the device identifier of the target border routing bridge device to the target border routing bridge device.

With reference to any one of the second aspect or the first to the third possible implementation manners of the second aspect, in a fourth possible implementation manner of the second aspect, before determining, by the first border routing bridge device, a device identifier group of the third area according to the first data packet, the method further includes obtaining, by the first border routing bridge device, a device identifier group of at least one area, where the device identifier group of each of the at least one area includes device identifiers of all border routing bridge devices of the area, and the third area is one of the at least one area.

With reference to the fourth possible implementation manner of the second aspect, in a fifth possible implementation manner of the second aspect, obtaining, by the first border routing bridge device, a device identifier group of at least one area includes obtaining, by the first border routing bridge device, the device identifier group of the at least one area according to device identifier group information of each of the at least one area that is sent by a border routing bridge device of the area.

With reference to the fourth or the fifth possible implementation manner of the second aspect, in a sixth possible implementation manner of the second aspect, determining, by the first border routing bridge device, a device identifier group of the third area according to the first data packet includes determining, by the first border routing bridge device, the device identifier group of the third area from the device identifier group of the at least one area according to information about the device identifier of the border routing bridge device of the third area that is included in the first data packet.

With reference to any one of the second aspect or the first to the sixth possible implementation manners of the second aspect, in a seventh possible implementation manner of the second aspect, before determining, by the first border routing bridge device, a device identifier group of the third area according to the first data packet, the method further includes determining, in the first area, by the first border routing bridge device, at least one other border routing bridge device of the first area other than the first border routing bridge device, and forming a device identifier group of the first area according to device identifiers of all border routing bridge devices of the first area, where all the border routing bridge devices of the first area include the first border routing bridge device.

With reference to the seventh possible implementation manner of the second aspect, in an eighth possible implementation manner of the second aspect, determining, in the first area, by the first border routing bridge device, at least one other border routing bridge device of the first area other than the first border routing bridge device includes determining, by the first border routing bridge device, the at least one other border routing bridge device of the first area respectively according to a respective device identifier sent by the at least one other border routing bridge device of the first area.

According to a third aspect, an embodiment of the present disclosure provides a border routing bridge device, where the border routing bridge device is a first border routing bridge device of a first area, and the border routing bridge device includes a receiving module configured to receive a first data packet sent by a border routing bridge device of a second area to the first area, where the first data packet includes a device identifier of the border routing bridge device of the second area that is used as a source routing bridge device identifier, a device identifier of the first border routing bridge device that is used as a target routing bridge device identifier, a device identifier of a source device, and a device identifier of a target device, a first determining module configured to determine a device identifier group of the second area according to the first data packet, where the device identifier group of the second area includes device identifiers of all border routing bridge devices of the second area, a second determining module configured to determine, one device identifier from the device identifier group of the second area according to the first data packet, where a border routing bridge device, which is identified by the determined device identifier, of the second area is used to forward a return data packet sent by the target device to the source device, and a sending module configured to send a second data packet that carries the determined device identifier to the target device, where the determined device identifier is used as a source routing bridge device identifier of the second data packet.

With reference to the third aspect, in a first possible implementation manner of the third aspect, the second determining module is further configured to set identifier information included in the first data packet as an input of a hash algorithm, and determine, from the device identifier group of the second area according to the hash algorithm, the device identifier corresponding to the border routing bridge device of the second area and that is used to forward the return data packet sent by the target device to the source device, where the identifier information includes at least one of the device identifier of the border routing bridge device of the second area, the device identifier of the first border routing bridge device, and the device identifier of the source device.

With reference to the third aspect, in a second possible implementation manner of the third aspect, the second determining module is further configured to determine, from the device identifier group of the second area using a shortest path algorithm according to identifier information included in the first data packet, the device identifier corresponding to the border routing bridge device of the second area and that is used to forward the return data packet sent by the target device to the source device, where the identifier information includes at least one of the device identifier of the border routing bridge device of the second area, the device identifier of the first border routing bridge device, the device identifier of the source device, and the device identifier of the target device.

With reference to any one of the third aspect or the first or the second possible implementation manner of the third aspect, in a third possible implementation manner of the third aspect, the sending module is further configured to determine that the determined device identifier is different from the device identifier corresponding to the source routing bridge device identifier of the first data packet, and set the determined device identifier as the source routing bridge device identifier of the second data packet, and send the second data packet that carries the determined device identifier to the target device.

With reference to any one of the third aspect or the first to the third possible implementation manners of the third aspect, in a fourth possible implementation manner of the third aspect, the border routing bridge device further includes an obtaining module configured to obtain a device identifier group of at least one area, where the device identifier group of each of the at least one area includes device identifiers of all border routing bridge devices of the area, and the second area is one of the at least one area.

With reference to the fourth possible implementation manner of the third aspect, in a fifth possible implementation manner of the third aspect, the obtaining module is further configured to obtain the device identifier group of the at least one area according to device identifier group information of each of the at least one area that is sent by a border routing bridge device of the area.

With reference to the fourth or the fifth possible implementation manner of the third aspect, in a sixth possible implementation manner of the third aspect, the first determining module is further configured to determine the device identifier group of the second area from the device identifier group of the at least one area according to information about the device identifier of the border routing bridge device of the second area that is included in the first data packet.

With reference to any one of the third aspect or the first to the sixth possible implementation manners of the third aspect, in a seventh possible implementation manner of the third aspect, the border routing bridge device further includes a third determining module configured to determine, in the first area, at least one other border routing bridge device of the first area other than the first border routing bridge device, and form a device identifier group of the first area according to device identifiers of all border routing bridge devices of the first area, where all the border routing bridge devices of the first area include the first border routing bridge device.

With reference to the seventh possible implementation manner of the third aspect, in an eighth possible implementation manner of the third aspect, the third determining module is further configured to determine the at least one other border routing bridge device of the first area respectively according to a respective device identifier sent by the at least one other border routing bridge device of the first area.

According to a fourth aspect, an embodiment of the present disclosure provides a border routing bridge device, where the border routing bridge device is a first border routing bridge device of a first area, and the border routing bridge device includes a first determining module configured to determine a device identifier group of the third area according to the first data packet when the first border routing bridge device of the first area sends a first data packet to a border routing bridge device of a third area, where the first data packet includes a device identifier of the first border routing bridge device that is used as a source routing bridge device identifier, a device identifier of the border routing bridge device of the third area that is used as a target routing bridge device identifier, a device identifier of a source device, and a device identifier of a target device, and the device identifier group of the third area includes device identifiers of all border routing bridge devices of the third area, a second determining module configured to determine a device identifier of a target border routing bridge device of the third area from the device identifier group of the third area according to the first data packet, where the target border routing bridge device of the third area is used to receive a data packet sent by the first border routing bridge device, and a sending module configured to send a second data packet that carries the device identifier of the target border routing bridge device to the target border routing bridge device, where the device identifier of the target border routing bridge device is used as a target routing bridge device identifier of the second data packet.

With reference to the fourth aspect, in a first possible implementation manner of the fourth aspect, the second determining module is further configured to set identifier information included in the first data packet as an input of a hash algorithm, and determine the device identifier of the target border routing bridge device of the third area from the device identifier group of the third area according to the hash algorithm, where the identifier information includes at least one of the device identifier of the first border routing bridge device, the device identifier of the border routing bridge device of the third area, the device identifier of the source device, and the device identifier of the target device.

With reference to the fourth aspect, in a second possible implementation manner of the fourth aspect, the second determining module is further configured to determine the device identifier of the target border routing bridge device of the third area from the device identifier group of the third area using a shortest path algorithm according to identifier information included in the first data packet, where the identifier information includes at least one of the device identifier of the first border routing bridge device, the device identifier of the border routing bridge device of the third area, the device identifier of the source device, and the device identifier of the target device.

With reference to any one of the fourth aspect or the first or the second possible implementation manner of the fourth aspect, in a third possible implementation manner of the fourth aspect, the sending module is further configured to determine that the device identifier of the target border routing bridge device is different from the device identifier corresponding to the target routing bridge device identifier of the first data packet, set the device identifier of the target border routing bridge device as the target routing bridge device identifier of the second data packet, and send the second data packet that carries the device identifier of the target border routing bridge device to the target border routing bridge device.

With reference to any one of the fourth aspect or the first to the third possible implementation manners of the fourth aspect, in a fourth possible implementation manner of the fourth aspect, the border routing bridge device further includes an obtaining module configured to obtain a device identifier group of at least one area, where the device identifier group of each of the at least one area includes device identifiers of all border routing bridge devices of the area, and the third area is one of the at least one area.

With reference to the fourth possible implementation manner of the fourth aspect, in a fifth possible implementation manner of the fourth aspect, the obtaining module is further configured to obtain the device identifier group of the at least one area according to device identifier group information of each of the at least one area that is sent by a border routing bridge device of the area.

With reference to the fourth or the fifth possible implementation manner of the fourth aspect, in a sixth possible implementation manner of the fourth aspect, the first determining module is further configured to determine the device identifier group of the third area from the device identifier group of the at least one area according to information about the device identifier of the border routing bridge device of the third area that is included in the first data packet.

With reference to any one of the fourth aspect or the first to the sixth possible implementation manners of the fourth aspect, in a seventh possible implementation manner of the fourth aspect, the border routing bridge device further includes a third determining module configured to determine, in the first area, at least one other border routing bridge device of the first area other than the first border routing bridge device, and form a device identifier group of the first area according to device identifiers of all border routing bridge devices of the first area, where all the border routing bridge devices of the first area include the first border routing bridge device.

With reference to the seventh possible implementation manner of the fourth aspect, in an eighth possible implementation manner of the fourth aspect, the third determining module is further configured to determine the at least one other border routing bridge device of the first area respectively according to a respective device identifier sent by the at least one other border routing bridge device of the first area.

In the present disclosure, a first border routing bridge device of a first area receives a first data packet sent by a border routing bridge device of a second area to the first area, where the first data packet includes a device identifier of the border routing bridge device of the second area that is used as a source routing bridge device identifier, a device identifier of the first border routing bridge device that is used as a target routing bridge device identifier, a device identifier of a source device, and a device identifier of a target device. The first border routing bridge device determines a device identifier group of the second area according to the first data packet, where the device identifier group of the second area includes device identifiers of all border routing bridge devices of the second area. Further, the first border routing bridge device determines one device identifier from the device identifier group of the second area according to the first data packet, where a border routing bridge device, which is identified by the determined device identifier, of the second area is used to forward a return data packet sent by the target device to the source device. Further, the first border routing bridge device sends a second data packet that carries the determined device identifier to the target device, where the determined device identifier is used as a source routing bridge device identifier of the second data packet such that the return data packet sent by the target device to the source device is sent to the source device using the border routing bridge device, which is identified by the determined device identifier, of the second area. Therefore, according to a different source device and target device of each data packet, a suitable border routing bridge device used to forward a return data packet sent by the target device of the data packet to the source device of the data packet can be selected from the device identifier group of the second area. In this way, per-flow load balancing is implemented.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

FIG. 4A is a schematic diagram 3 of an application scenario of a data packet transmission method according to the present disclosure;

FIG. 4B is a schematic flowchart of Embodiment 3 of a data packet transmission method according to the present disclosure;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1A:
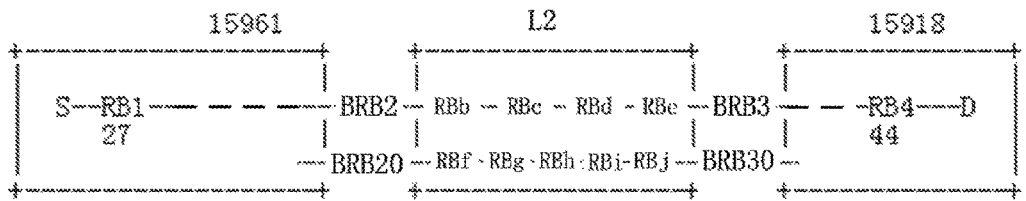
FIG. 1A is a schematic diagram of a multilevel TRILL network on which an aggregate nickname is used.
Figure 1B:
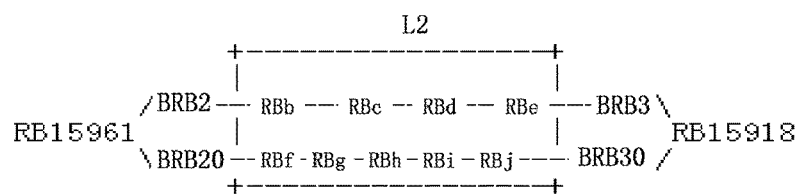
FIG. 1B is a topological diagram of the network shown in FIG. 1A on an L2 network.
Figure 2A:
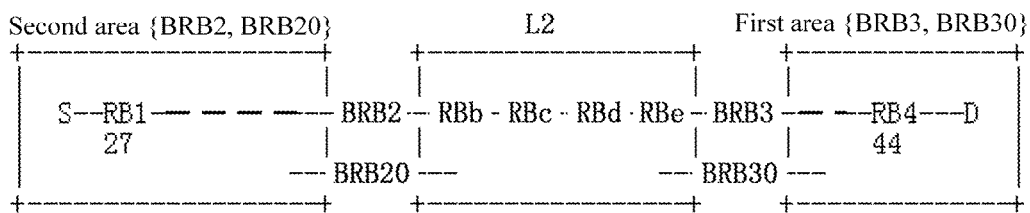
FIG. 2A is a schematic diagram 1 of an application scenario of a data packet transmission method according to the present disclosure.
Figure 2B:
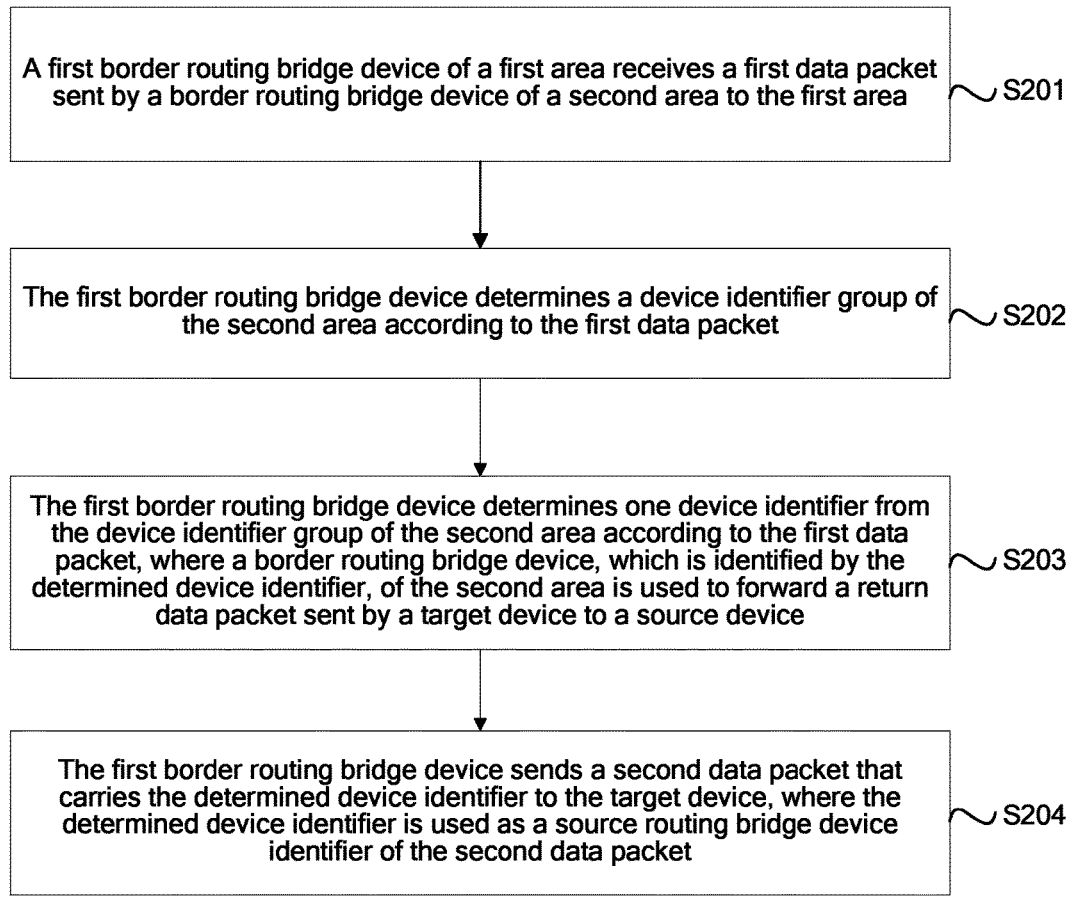
FIG. 2B is a schematic flowchart of Embodiment 1 of a data packet transmission method according to the present disclosure.

FIG. 2A is a schematic diagram 1 of an application scenario of a data packet transmission method according to the present disclosure. FIG. 2B is a schematic flowchart of Embodiment 1 of a data packet transmission method according to the present disclosure. As shown in FIG. 2B, the method in this embodiment may include the following steps.

Step S201: A first border routing bridge device of a first area receives a first data packet sent by a border routing bridge device of a second area to the first area.

The first data packet includes a device identifier of the border routing bridge device of the second area that is used as a source routing bridge device identifier, a device identifier of the first border routing bridge device that is used as a target routing bridge device identifier, a device identifier of a source device, and a device identifier of a target device.

In this embodiment of the present disclosure, as shown in FIG. 2A, the first area and the second area are two areas on an L1 network, and the first area is connected to and communicates with the second area using a border routing bridge device. In actual network deployment, considering load balancing and network robustness, there are usually at least two BRBs between two areas. As shown in FIG. 2A, border routing bridge devices of the first area include BRB3 and BRB30, and border routing bridge devices of the second area include BRB2 and BRB20. BRB2, BRB20, BRB3, and BRB30 belong to both an L1 network and an L2 network. In this embodiment of the present disclosure, each area is represented by a device identifier (which is optionally a nickname) group of all border routing bridge devices in the area. For example, the first area may be represented by {BRB3, BRB30}, and the second area may be represented by {BRB2, BRB20}. That is, existing nicknames are used such that configuration overheads can be reduced to some extent. In this embodiment of the present disclosure, the first border routing bridge device (such as BRB3) of the first area receives a first data packet (that is, the first data packet is a packet sent to a target device in the first area) sent by the border routing bridge device (such as BRB2) of the second area to the first area. Optionally, the first data packet includes source routing bridge device identifier field information (optionally, the source routing bridge device identifier field information is a source nickname of the first data packet), target routing bridge device identifier field information (optionally, the target routing bridge device identifier field information is a target nickname of the first data packet), device identifier field information of the source device (optionally, the device identifier field information of the source device is a source MAC address of the first data packet), and device identifier field information of the target device (optionally, the device identifier field information of the target device is a target MAC address of the first data packet). Optionally, in this embodiment of the present disclosure, the source routing bridge device identifier of the first data packet is the device identifier of the border routing bridge device of the second area (such as a nickname corresponding to BRB2), the target routing bridge device identifier of the first data packet is the device identifier of the first border routing bridge device (such as a nickname corresponding to BRB3), the device identifier of the source device (such as an identifier of host S), and the device identifier of the target device (such as an identifier of host D).

Step S202: The first border routing bridge device determines a device identifier group of the second area according to the first data packet.

In this embodiment of the present disclosure, the first border routing bridge device (such as BRB3) determines a device identifier group of the second area (the device identifier group of the second area includes device identifiers of all border routing bridge devices of the second area) according to the source routing bridge device identifier field information included in the first data packet. That is, the first border routing bridge device (BRB3) can learn all the border routing bridge devices of the second area according to the source routing bridge device identifier field information of the first data packet. Therefore, the first border routing bridge device may further select, from the device identifier group of the second area according to a different source device and target device of each data packet, a device identifier (such as BRB2 or BRB20) of a suitable border routing bridge device used to forward a return data packet sent by the target device of the data packet to the source device of the data packet, and send, to the source device using the border routing bridge device identified by the device identifier, the return data packet sent by the target device of the data packet to the source device of the data packet, thereby implementing per-flow load balancing.

Optionally, before step S202, the method further includes obtaining, by the first border routing bridge device, a device identifier group of at least one area, where the device identifier group of each of the at least one area includes device identifiers of all border routing bridge devices of the area, and the second area is one of the at least one area.

In this embodiment of the present disclosure, before determining the device identifier group of the second area according to the first data packet, the first border routing bridge device may obtain in advance a device identifier group of at least one area that can be reached using the L2 network. The device identifier group of each of the at least one area that can be reached using the L2 network includes device identifiers of all border routing bridge devices of the area. Optionally, device identifier groups of areas that can be reached by the first border routing bridge device using the L2 network may be pre-configured in the first border routing bridge device (such as BRB3) of the first area. A device identifier group of each of the areas includes device identifiers of all border routing bridge devices of the area. Optionally, obtaining, by the first border routing bridge device, a device identifier group of at least one area includes obtaining, by the first border routing bridge device, the device identifier group of the at least one area according to device identifier group information of each of the at least one area that is sent by a border routing bridge device of the area. In this embodiment of the present disclosure, border routing bridge devices of different areas learn device identifier groups of the areas of each other by exchanging L1_BRB_Group type-length-value (TLV) messages using Link State Protocol Data Unit (LSP) of IS-IS L2. A defined TLV message includes Type, Length, and Value fields. Type=L1_BRB_Group (that is, a type of the TLV message represents a device identifier group of an area), Length=16×k (that is, representing that a length of the TLV message is 16×k, where k is a quantity of device identifiers or nicknames included in the device identifier group), and Value=border routing bridge nickname group (that is, a value of the TLV message represents device identifiers in a device identifier group of a corresponding area). For example, the border routing bridge device BRB3 and/or the border routing bridge device BRB30 of the first area obtains a device identifier group {BRB2, BRB20} of the second area according to an L1_BRB_Group TLV message sent by the border routing bridge device BRB2 and/or the border routing bridge device BRB20 of the second area, where Type=L1_BRB_Group, Length=16×2 (where 2 is a quantity of device identifiers or nicknames included in the device identifier group of the second area), and Value={BRB20, BRB2}. It can be seen that, a device identifier group of the at least one area is automatically obtained by means of LSP synchronization instead of configuration. In addition, in this embodiment of the present disclosure, the first border routing bridge device may alternatively obtain a device identifier group of at least one area in another manner. Details are not described herein.

Optionally, step S202 includes determining, by the first border routing bridge device, the device identifier group of the second area from the device identifier group of the at least one area according to information about the device identifier of the border routing bridge device of the second area that is included in the first data packet.

In this embodiment of the present disclosure, when the first border routing bridge device (such as BRB3) of the first area receives the first data packet sent by the border routing bridge device (such as BRB2) of the second area to the first area, the first border routing bridge device (BRB3) compares the device identifier of the border routing bridge device (BRB2) of the second area corresponding to the source routing bridge device identifier field information of the first data packet with the obtained device identifier group of the at least one area. If a device identifier group of an area A of the at least one area includes the device identifier of the border routing bridge device (BRB2) of the second area, it is determined that the device identifier group of the area A is the device identifier group of the second area.

Step S203: The first border routing bridge device determines one device identifier from the device identifier group of the second area according to the first data packet, where a border routing bridge device, which is identified by the determined device identifier, of the second area is used to forward a return data packet sent by a target device to a source device.

In this embodiment of the present disclosure, the first border routing bridge device (such as BRB3) determines, from the device identifier group of the second area according to field information (optionally, the field information includes at least one of source routing bridge device identifier field information, target routing bridge device identifier field information, device identifier field information of the source device, the device identifier filed information of the target device, VLAN identifier information, and fine grained label information) of the first data packet and a local algorithm (such as a hash algorithm, a shortest path algorithm, or another screening algorithm), a device identifier (such as BRB2 or BRB20) of a border routing bridge device of the second area that is used to receive and forward the return data packet sent by the target device to the source device (that is, according to a different source device and target device of each data packet, a suitable border routing bridge device used to forward a return data packet sent by the target device of the data packet to the source device of the data packet can be selected from the device identifier group of the second area, and the return data packet sent by the target device of the data packet to the source device of the data packet can be sent to the source device of the data packet using the border routing bridge device). Optionally, the source routing bridge device identifier field information of the first data packet is the device identifier of the border routing bridge device of the second area (such as the nickname corresponding to BRB2), the target routing bridge device identifier field information of the first data packet is the device identifier of the first border routing bridge device (such as the nickname corresponding to BRB3), the device identifier filed information of the source device (such as the identifier of host S), and the device identifier filed information of the target device (such as the identifier of host D).

Optionally, step S203 includes setting, by the first border routing bridge device, identifier information included in the first data packet as an input of a hash algorithm, and determining, from the device identifier group of the second area according to the hash algorithm, the device identifier corresponding to the border routing bridge device of the second area and that is used to forward the return data packet sent by the target device to the source device, where the identifier information includes at least one of the device identifier of the border routing bridge device of the second area, the device identifier of the first border routing bridge device, and the device identifier of the source device.

In this embodiment of the present disclosure, the first border routing bridge device uses the identifier information included in the first data packet as an input of the hash algorithm, and determines, from the device identifier group of the second area according to the hash algorithm, the device identifier corresponding to the border routing bridge device of the second area and that is used to forward the return data packet sent by the target device to the source device. Optionally, the identifier information includes at least one of the device identifier of the border routing bridge device of the second area, the device identifier of the first border routing bridge device, the device identifier of the source device of the data first packet, the VLAN identifier information, and the fine grained label identifier information. Optionally, the first border routing bridge device creates an index (for example, index=1 corresponds to BRB2, and index=2 corresponds to BRB20) for the device identifier group of the second area according to the field information of the first data packet, and uses the index as an input of the hash algorithm. Further, an index value (for example, index=1 or index=2) is calculated according to the hash algorithm, and the device identifier corresponding to the border routing bridge device of the second area and that is used to forward the return data packet sent by the target device to the source device is determined according to the index value outputted by the hash algorithm (for example, when the outputted index value is index=1, it indicates that the determined device identifier corresponding to the border routing bridge device of the second area and that is used to forward the return data packet sent by the target device to the source device is BRB2, or when the outputted index value is index=2, it indicates that the determined device identifier corresponding to the border routing bridge device of the second area and that is used to forward the return data packet sent by the target device to the source device is BRB20).

Optionally, step S203 includes determining, by the first border routing bridge device from the device identifier group of the second area using a shortest path algorithm according to identifier information included in the first data packet, the device identifier corresponding to the border routing bridge device of the second area and that is used to forward the return data packet sent by the target device to the source device, where the identifier information includes at least one of the device identifier of the border routing bridge device of the second area, the device identifier of the first border routing bridge device, the device identifier of the source device, and the device identifier of the target device.

In this embodiment of the present disclosure, the first border routing bridge device determines, from the device identifier group of the second area using the shortest path algorithm according to the identifier information included in the first data packet, a device identifier of a nearest border routing bridge device that is of the second area and that corresponds to a shortest path from the first border routing bridge device to a routing bridge device of the second area, where the device identifier of the nearest border routing bridge device is used as the device identifier corresponding to the border routing bridge device of the second area and that is used to forward the return data packet sent by the target device to the source device. Optionally, the identifier information may include at least one of the device identifier of the border routing bridge device of the second area, the device identifier of the first border routing bridge device, the device identifier of the source device of the first data packet, the device identifier of the target device of the first data packet, the VLAN identifier information, and the fine grained label identifier information. Optionally, the first border routing bridge calculates overheads of paths that are from the first border routing bridge device to routing bridge devices of the second area according to the shortest path algorithm, and compares the calculated overheads of the paths, to obtain a minimum path overhead (where a path that is from the first border routing bridge device to a routing bridge device of the second area and that corresponds to the minimum path overhead is the shortest path), and the device identifier that is of the nearest border routing bridge device of the second area and that corresponds to the shortest path is the device identifier corresponding to the border routing bridge device of the second area and that is used to forward the return data packet sent by the target device to the source device.

Step S204: The first border routing bridge device sends a second data packet that carries the determined device identifier to the target device, where the determined device identifier is used as a source routing bridge device identifier of the second data packet.

In this embodiment of the present disclosure, the first border routing bridge device sends the second data packet that carries the determined device identifier to the target device, where the determined device identifier is used as the source routing bridge device identifier of the second data packet. That is, the source routing bridge device identifier of the second data packet sent by the first border routing bridge device to the target device is the device identifier determined in step S203 (optionally, a source nickname of the second data packet is the determined device identifier) such that the return data packet (a return packet corresponding to the first data packet that is received by the first border routing bridge device and that is sent by the border routing bridge device of the second area to the first area) sent by the target device to the source device is sent to the source device using the border routing bridge device, which is identified by the determined device identifier, of the second area. Therefore, according to a different source device and target device of each data packet, a device identifier of a suitable border routing bridge device used to forward a return data packet sent by the target device of the data packet to the source device of the data packet can be selected from the device identifier group of the second area, and the return data packet sent by the target device of the data packet to the source device of the data packet can be sent to the source device using the border routing bridge device identified by the device identifier. In this way, per-flow load balancing is implemented.

Optionally, step S204 includes determining, by the first border routing bridge device, that the determined device identifier is different from the device identifier corresponding to the source routing bridge device identifier of the data packet, setting, by the first border routing bridge device, the determined device identifier as the source routing bridge device identifier of the second data packet, and sending the second data packet that carries the determined device identifier to the target device.

In this embodiment of the present disclosure, the first border routing bridge device (such as BRB3) determines whether the determined device identifier (such as BRB2 or BRB20) is the same as the device identifier (such as BRB2) corresponding to the source routing bridge device identifier of the first data packet. If the determined device identifier is the same as the device identifier corresponding to the source routing bridge device identifier of the first data packet (that is, if the determined device identifier is BRB2), the first border routing bridge device directly sends the second data packet that carries the determined device identifier to the target device (in this case, the first data packet is different from the second data packet only in target border routing bridge device identifier information corresponding to the data packets, and all other portions are the same). If the determined device identifier is different from the device identifier corresponding to the source routing bridge device identifier of the first data packet (that is, if the determined device identifier is BRB20), the first border routing bridge device sets the determined device identifier (such as BRB20) as the source routing bridge device identifier of the second data packet (that is, changes the device identifier of the border routing bridge device of the second area corresponding to the source routing bridge device identifier of the first data packet to the determined device identifier, to form the second data packet, and optionally, sets the determined device identifier as the source routing bridge device identifier of the second data packet by changing the source nickname of the first data packet) (in this case, the first data packet is different from the second data packet in target border routing bridge device identifier information and source border routing bridge device identifier information that correspond to the data packets, and all other portions are the same), and sends the second data packet that carries the determined device identifier to the target device such that the return data packet sent by the target device to the source device is sent to the source device using the border routing bridge device, which is identified by the determined device identifier, of the second area. Therefore, according to a different source device and target device of each data packet, a suitable border routing bridge device used to forward a return data packet sent by the target device of the data packet to the source device of the data packet can be selected from the device identifier group of the second area. In this way, per-flow load balancing is implemented.

In this embodiment of the present disclosure, a first border routing bridge device of a first area receives a first data packet sent by a border routing bridge device of a second area to the first area, where the first data packet includes a device identifier of the border routing bridge device of the second area that is used as a source routing bridge device identifier, a device identifier of the first border routing bridge device that is used as a target routing bridge device identifier, a device identifier of a source device, and a device identifier of a target device. The first border routing bridge device determines a device identifier group of the second area according to the first data packet, where the device identifier group of the second area includes device identifiers of all border routing bridge devices of the second area. Further, the first border routing bridge device determines one device identifier from the device identifier group of the second area according to the first data packet, where a border routing bridge device, which is identified by the determined device identifier, of the second area is used to forward a return data packet sent by the target device to the source device. Further, the first border routing bridge device sends a second data packet that carries the determined device identifier to the target device, where the determined device identifier is used as a source routing bridge device identifier of the second data packet such that the return data packet sent by the target device to the source device is sent to the source device using the border routing bridge device, which is identified by the determined device identifier, of the second area. Therefore, according to a different source device and target device of each data packet, a suitable border routing bridge device used to forward a return data packet sent by the target device of the data packet to the source device of the data packet can be selected from the device identifier group of the second area. In this way, per-flow load balancing is implemented.

Optionally, before step S202, the method further includes determining, in the first area, by the first border routing bridge device, at least one other border routing bridge device of the first area other than the first border routing bridge device, and forming a device identifier group of the first area according to device identifiers of all border routing bridge devices of the first area, where all the border routing bridge devices of the first area include the first border routing bridge device.

In this embodiment of the present disclosure, to reduce configuration overheads, each area is represented by a device identifier (which is optionally a nickname) group of all border routing bridge devices in the area. For example, the first area may be represented by {BRB3, BRB30}, and the second area may be represented by {BRB2, BRB20}. Optionally, before determining the device identifier group of the second area according to the data packet, the first border routing bridge device (BRB3) may first determine, in the first area, at least one other border routing bridge device (BRB30) of the first area other than the first border routing bridge device (BRB3), and form the device identifier group {BRB3, BRB30} of the first area according to the device identifiers of all the border routing bridge devices of the first area. Therefore, the first area may be represented by {BRB3, BRB30}.

Optionally, determining, in the first area, by the first border routing bridge device, at least one other border routing bridge device of the first area other than the first border routing bridge device includes determining, by the first border routing bridge device, the at least one other border routing bridge device of the first area respectively according to a respective device identifier sent by the at least one other border routing bridge device of the first area.

Optionally, a routing bridge device in this embodiment of the present disclosure may use an attach-bit defined in an LSP to indicate that it is a border routing bridge device. By listening on an LSP of other border routing bridge devices, a border routing bridge device in this embodiment of the present disclosure obtains device identifiers of all border routing bridge devices in an area to which the border routing bridge device belongs. Optionally, border routing bridge devices of each area may learn device identifiers of each other by exchanging L1_BRB TLV messages using LSPs of IS-IS L1 (that is, a border routing bridge device of each area needs to send its nickname as a border routing bridge device to at least one other border routing bridge device of the same area by sending a TLV message). A defined TLV message includes Type, Length, and Value fields. Type=L1_BRB (that is, a type of the TLV message represents a device identifier of a border routing bridge device), Length=2, and Value=border routing bridge nickname (that is, a value of the TLV message represents a device identifier of the corresponding border routing bridge device). For example, the border routing bridge device BRB3 of the first area determines the border routing bridge device BRB30 according to an L1_BRB TLV message (which carries the device identifier BRB30 of the border routing bridge device BRB30) sent by the border routing bridge device BRB30 of the first area, where Type=L1_BRB, Length=2, and Value=BRB30. It can be seen that, a device identifier of at least one other border routing bridge device of a same area is automatically obtained by means of protocol synchronization instead of configuration. In addition, in this embodiment of the present disclosure, the first border routing bridge device may determine, in the first area, at least one other border routing bridge device of the first area other than the first border routing bridge device in another manner. Details are not described herein again.

Optionally, in the foregoing embodiment of the present disclosure, the border routing bridge devices of the first area are not limited to BRB3 and BRB30, and may further include at least one other border routing bridge device. Similarly, the border routing bridge devices of the second area are not limited to BRB2 and BRB20, and may further include at least one other border routing bridge device. Optionally, the L1 network not only includes the first area and the second area, but also may further include another area. When the L1 network further includes another area, any border routing bridge device in the other area may also use the data packet transmission method in the foregoing embodiment of the present disclosure. Details are not described herein again (in the present disclosure, the data packet transmission method of the present disclosure is described in detail using the first area and the second area as an example).

Optionally, in this embodiment of the present disclosure, it is not limited that a border routing bridge device of the first area implements per-flow load balancing using the data packet transmission method in the foregoing embodiment of the present disclosure when a source border routing bridge device of the second area sends a data packet to the border routing bridge device of the first area. When a source border routing bridge device of the first area sends a data packet to a border routing bridge device of the second area, the border routing bridge device of the second area may also implement per-flow load balancing using the data packet transmission method in the foregoing embodiment of the present disclosure. Details are not described herein again.

Figure 3:
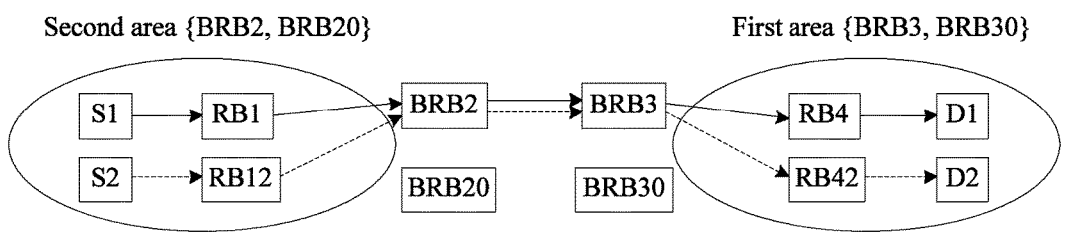
FIG. 3 is a schematic diagram 2 of an application scenario of a data packet transmission method according to the present disclosure.

FIG. 3 is a schematic diagram 2 of an application scenario of a data packet transmission method according to the present disclosure. Based on the foregoing embodiment, a method in Embodiment 2 of the data packet transmission method of the present disclosure may include the following steps (not shown).

Step S301: A first border routing bridge device (such as BRB3) of a first area determines, in the first area, at least one other border routing bridge device of the first area other than the first border routing bridge device, and forms a device identifier group {BRB3, BRB30} of the first area according to device identifiers of all border routing bridge devices of the first area.

Step S302: The first border routing bridge device (BRB3) obtains a device identifier group of at least one area, such as a device identifier group {BRB2, BRB20} of a second area or a device identifier group {BRB0, BRB00} of a third area (which is not shown in FIG. 3).

In this embodiment of the present disclosure, step S301 and step S302 are not limited to a specific order. For example, step S301 may be performed before step S302, step S302 may be performed before step S301, or step S301 or step S302 may be performed in parallel.

Step S303: The first border routing bridge device (i.e., BRB3) receives a first data packet sent by a border routing bridge device (such as BRB2) of the second area to the first area, where the first data packet includes a device identifier (i.e., BRB2) of the border routing bridge device of the second area that is used as a source routing bridge device identifier, a device identifier (i.e., BRB3) of the first border routing bridge device that is used as a target routing bridge device identifier, a device identifier of a source device, and a device identifier of a target device.

Step S304: The first border routing bridge device (i.e., BRB3) determines the device identifier group {BRB2, BRB20} of the second area from the device identifier group of the at least one area according to the first data packet, where the device identifier group of the at least one area includes {BRB2, BRB20} and {BRB0, BRB00}.

Step S305: The first border routing bridge device (i.e., BRB3) determines one device identifier from the device identifier group {BRB2, BRB20} of the second area according to the first data packet, where a border routing bridge device, which is identified by the determined device identifier, of the second area is used to forward a return data packet sent by the target device to the source device.

In this embodiment of the present disclosure, the first border routing bridge device (i.e., BRB3) determines, from the device identifier group of the second area according to field information (optionally, the field information includes at least one of source routing bridge device identifier field information, target routing bridge device identifier field information, device identifier field information of the source device, the device identifier of the target device, VLAN identifier information, and fine grained label information) of the first data packet and a local algorithm (such as a hash algorithm, a shortest path algorithm, or another screening algorithm), a device identifier (such as BRB2 or BRB20) of a border routing bridge device used to forward the return data packet sent by the target device to the source device. Therefore, according to a different source device and target device of each data packet, a suitable border routing bridge device used to forward a return data packet sent by the target device of the data packet to the source device of the data packet can be selected from the device identifier group of the second area. (1) For example, when the device identifier of the source device corresponding to the device identifier field information of the source device in the first data packet is S1, and the device identifier of the target device corresponding to the device identifier field information of the target device in the first data packet is D1 (as shown by solid-line arrows in FIG. 3), the first border routing bridge device (BRB3) may determine, from the device identifier group of the second area according to the first data packet and the local algorithm, that the border routing bridge device used to forward the return data packet sent by the target device to the source device is BRB2. In this case, the return data packet sent by the target device D1 of the first data packet to the source device S1 of the first data packet may be sent to the source device S1 of the first data packet using the border routing bridge device BRB2. (2) For example, when the device identifier of the source device corresponding to the device identifier field information of the source device in the first data packet is S2, and the device identifier of the target device corresponding to the device identifier field information of the target device in the first data packet is D2 (as shown by dashed-line arrows in FIG. 3), the first border routing bridge device (BRB3) may determine, from the device identifier group of the second area according to the first data packet and the local algorithm, that the border routing bridge device used to forward the return data packet sent by the target device to the source device is BRB20. In this case, the return data packet sent by the target device D2 of the first data packet to the source device S2 of the first data packet may be sent to the source device S2 of the first data packet using the border routing bridge device BRB20.

Optionally, for example, when the device identifier of the source device corresponding to the device identifier field information of the source device in the first data packet is S1, and the device identifier of the target device corresponding to the device identifier field information of the target device in the first data packet is D1, information about fields of a data packet sent by RB1 are respectively: source nickname=RB1, target nickname=BRB3, source MAC address=S1, and target MAC address=D1, and information about fields of the first data packet sent by BRB2 are respectively: source nickname=BRB2, target nickname=BRB3, source MAC address=S1, and target MAC address=D1.

Step S306: The first border routing bridge device sends a second data packet that carries the determined device identifier to the target device, where the determined device identifier is used as a source routing bridge device identifier of the second data packet. For example, when the device identifier of the source device in the field information of the first data packet is S1 and the device identifier of the target device in the field information of the first data packet is D1, information about fields of the second data packet that carries the determined device identifier are respectively: source nickname=determined device identifier, target nickname=RB4, source MAC address=S1, and target MAC address=D1 such that the return data packet sent by the target device to the source device is sent to the source device using the border routing bridge device, which is identified by the determined device identifier, of the second area. Therefore, according to a different source device and target device (such as S1/D1 (from RB1/RB4) or S2/D2 (from RB12/RB42)) of each data packet, a suitable border routing bridge device used to forward a return data packet sent by the target device of the data packet to the source device of the data packet can be selected from the device identifier group of the second area. Therefore, not only per-flow load balancing is implemented, but also configuration overheads are reduced.

In the foregoing data packet transmission method of the present disclosure, a first border routing bridge device of a first area receives a first data packet sent by a border routing bridge device of a second area to the first area. The first border routing bridge device determines a device identifier group of the second area according to the first data packet, and determines, from the device identifier group of the second area according to the first data packet, a device identifier of a border routing bridge device used to forward a return data packet sent by a target device to a source device. Further, the first border routing bridge device sends a second data packet that carries the determined device identifier to the target device, where the determined device identifier is used as a source routing bridge device identifier of the second data packet such that the return data packet sent by the target device to the source device is sent to the source device using the border routing bridge device, which is identified by the determined device identifier, of the second area. Therefore, according to a different source device and target device of each data packet, a suitable border routing bridge device used to forward a return data packet sent by the target device of the data packet to the source device of the data packet can be selected from the device identifier group of the second area. In this way, per-flow load balancing of return data packets is implemented. Further, in this embodiment of the present disclosure, per-flow load balancing of forward data packets may further be implemented. A specific implementation method is as described in Embodiment 3 of the data packet transmission method of the present disclosure.

FIG. 4A is a schematic diagram 3 of an application scenario of a data packet transmission method according to the present disclosure. FIG. 4B is a schematic flowchart of Embodiment 3 of a data packet transmission method according to the present disclosure. As shown in FIG. 4B, the method in this embodiment may include the following steps.

Step S401: When a first border routing bridge device of a first area sends a first data packet to a border routing bridge device of a third area, the first border routing bridge device determines a device identifier group of the third area according to the first data packet.

The first data packet includes a device identifier of the first border routing bridge device that is used as a source routing bridge device identifier, a device identifier of the border routing bridge device of the third area that is used as a target routing bridge device identifier, a device identifier of a source device, and a device identifier of a target device, and the device identifier group of the third area includes device identifiers of all border routing bridge devices of the third area.

In this embodiment of the present disclosure, as shown in FIG. 4A, the first area and the third area are two areas on an L1 network, and the first area is connected to and communicates with the third area using a border routing bridge device. In actual network deployment, considering load balancing and network robustness, there are usually at least two BRBs between two areas. As shown in FIG. 4A, border routing bridge devices of the first area include BRB3 and BRB30, and border routing bridge devices of the third area include BRB0 and BRB00. In this embodiment of the present disclosure, each area is represented by a device identifier (which is optionally a nickname) group of all border routing bridge devices in the area. For example, the first area may be represented by {BRB3, BRB30}, and the third area may be represented by {BRB0, BRB00}. That is, existing nicknames are used such that configuration overheads can be reduced to some extent.

When the first border routing bridge device (such as BRB3) of the first area needs to send a first data packet to a border routing bridge device (such as BRB0) of the third area, optionally, the first data packet includes source routing bridge device identifier field information (optionally, the source routing bridge device identifier field information is a source nickname of the first data packet), target routing bridge device identifier field information (optionally, the target routing bridge device identifier field information is a target nickname of the first data packet), device identifier field information of the source device (optionally, the device identifier field information of the source device is a source MAC address of the first data packet), and device identifier field information of the target device (optionally, the device identifier field information of the target device is a target MAC address of the first data packet). Optionally, in this embodiment of the present disclosure, the source routing bridge device identifier of the first data packet is a device identifier of the first border routing bridge device (such as a nickname corresponding to BRB3), the target routing bridge device identifier of the first data packet is the device identifier of the border routing bridge device of the third area (such as a nickname corresponding to BRB0), the device identifier field information of the source device is the device identifier of the source device (such as an identifier of host S1), and the device identifier filed information of the target device is the device identifier of the target device (such as an identifier of host D1). The first border routing bridge device determines a device identifier group of the third area according to the target routing bridge device identifier field information included in the first data packet (the device identifier group of the third area includes device identifiers of all border routing bridge devices of the third area). That is, the first border routing bridge device can learn all the border routing bridge devices of the third area according to the target routing bridge device identifier field information of the first data packet, and therefore may further select a suitable target border routing bridge device (such as BRB0 or BRB00) from the device identifier group of the third area according to a different source device and target device (such as S1/D1 or S2/D2) of each data packet, thereby implementing per-flow load balancing of forward data packets.

Optionally, before step S401, the method further includes obtaining, by the first border routing bridge device, a device identifier group of at least one area, where the device identifier group of each of the at least one area includes device identifiers of all border routing bridge devices of the area, and the third area is one of the at least one area.

In this embodiment of the present disclosure, before determining the device identifier group of the third area according to the first data packet, the first border routing bridge device may obtain in advance a device identifier group of at least one area that can be reached using the L2 network. The device identifier group of each of the at least one area that can be reached using the L2 network includes device identifiers of all border routing bridge devices of the area. Optionally, device identifier groups of areas that can be reached by the first border routing bridge device using the L2 network may be pre-configured in the first border routing bridge device (such as BRB3) of the first area. A device identifier group of each of the areas includes device identifiers of all border routing bridge devices of the area. Optionally, obtaining, by the first border routing bridge device, a device identifier group of at least one area includes obtaining, by the first border routing bridge device, the device identifier group of the at least one area according to device identifier group information of each of the at least one area that is sent by a border routing bridge device of the area. A specific manner is similar to the manner in which the first border routing bridge device obtains the device identifier group of the at least one area in Embodiment 1 of the foregoing data packet transmission method of the present disclosure. Details are not described herein again.

Optionally, step S401 includes determining, by the first border routing bridge device, the device identifier group of the third area from the device identifier group of the at least one area according to information about the device identifier of the border routing bridge device of the third area that is included in the first data packet.

In this embodiment of the present disclosure, when the first border routing bridge device (such as BRB3) of the first area needs to send a first data packet to a border routing bridge device (such as BRB0) of the third area, the first border routing bridge device (BRB3) compares a device identifier (BRB0) of a border routing bridge device of the third area corresponding to target routing bridge device identifier field information of the first data packet with the obtained device identifier group of the at least one area (the third area is one of the at least one area). If a device identifier group of an area B of the at least one area includes the device identifier of the border routing bridge device (BRB0) of the third area, it is determined that the device identifier group of the area B is the device identifier group of the third area.

Step S402: The first border routing bridge device determines a device identifier of a target border routing bridge device of the third area from the device identifier group of the third area according to the first data packet.

In this embodiment of the present disclosure, the first border routing bridge device (BRB3) determines, from the device identifier group of the third area according to field information (optionally, the field information includes at least one of source routing bridge device identifier field information, target routing bridge device identifier field information, device identifier field information of the source device, the device identifier of the target device, VLAN identifier information, and fine grained label information) of the first data packet and a local algorithm (such as a hash algorithm, a shortest path algorithm, or another screening algorithm), a device identifier (such as BRB0 or BRB00) of a target border routing bridge device used to receive a data packet sent by the first border routing bridge device (that is, according to a different source device and target device of each data packet, a suitable target border routing bridge device used to receive the data packet sent by the first border routing bridge device can be selected from the device identifier group of the third area such that the data packet sent by the source device of the data packet to the target device of the data packet can be sent to the target device of the data packet using the target border routing bridge device of the third area). Optionally, the source routing bridge device identifier field information of the first data packet is the device identifier of the first border routing bridge device (such as the nickname corresponding to BRB3), the target routing bridge device identifier field information of the first data packet is the device identifier of the border routing bridge device of the third area (such as the nickname corresponding to BRB0), the device identifier field information of the source device is the device identifier of the source device (such as an identifier of host S1), and the device identifier filed information of the target device is the device identifier of the target device (such as an identifier of host D1).

Optionally, step S402 includes setting, by the first border routing bridge device, identifier information included in the first data packet as an input of a hash algorithm, and determining the device identifier of the target border routing bridge device of the third area from the device identifier group of the third area according to the hash algorithm, where the identifier information includes at least one of the device identifier of the first border routing bridge device, the device identifier of the border routing bridge device of the third area, the device identifier of the source device, and the device identifier of the target device. Optionally, the step 402 further includes determining, by the first border routing bridge device, the device identifier of the target border routing bridge device of the third area from the device identifier group of the third area using a shortest path algorithm according to identifier information included in the first data packet, where the identifier information includes at least one of the device identifier of the first border routing bridge device, the device identifier of the border routing bridge device of the third area, the device identifier of the source device, and the device identifier of the target device. A specific process is similar to the manner in which the first border routing bridge device determines, from the device identifier group of the second area according to the first data packet, the device identifier that is of the border routing bridge device of the second area and that is used to forward the return data packet sent by the target device to the source device in the foregoing embodiment of the present disclosure. Details are not described herein again.

Step S403: The first border routing bridge device sends a second data packet that carries the device identifier of the target border routing bridge device to the target border routing bridge device, where the device identifier of the target border routing bridge device is used as a target routing bridge device identifier of the second data packet.

In this embodiment of the present disclosure, the first border routing bridge device sends a second data packet that carries the device identifier of the target border routing bridge device to the target border routing bridge device, where the device identifier of the target border routing bridge device is used as a target routing bridge device identifier of the second data packet. That is, the first border routing bridge device sends the second data packet to the target border routing bridge device according to the device identifier of the target border routing bridge device that is determined in step S402, and the target routing bridge device identifier of the second data packet is the device identifier of the target border routing bridge device that is determined in step S402 (optionally, a target nickname of the second data packet is the device identifier of the target border routing bridge device). Therefore, according to a different source device and target device of each data packet, a suitable target border routing bridge device used to receive the data packet sent by the first border routing bridge device can be selected from the device identifier group of the third area, and the data packet can be sent to the target device of the data packet using the target border routing bridge device, thereby implementing per-flow load balancing.

Optionally, step S403 includes determining, by the first border routing bridge device, that the device identifier of the target border routing bridge device is different from the device identifier corresponding to the target routing bridge device identifier of the first data packet, setting, by the first border routing bridge device, the device identifier of the target border routing bridge device as the target routing bridge device identifier of the second data packet, and sending the second data packet that carries the device identifier of the target border routing bridge device to the target border routing bridge device.

In this embodiment of the present disclosure, the first border routing bridge device (such as BRB3) determines whether the device identifier (such as BRB0 or BRB00) of the target border routing bridge device is the same as the device identifier (such as BRB0) corresponding to the target routing bridge device identifier of the first data packet. If the device identifier of the target border routing bridge device is the same as the device identifier corresponding to the target routing bridge device identifier of the first data packet (that is, if the device identifier of the target border routing bridge device is BRB0), the first border routing bridge device directly sends the second data packet that carries the device identifier of the target border routing bridge device to the target border routing bridge device (in this case, the first data packet is different from the second data packet only in source border routing bridge device identifier information corresponding to the data packets, and all other portions are the same). If the device identifier of the target border routing bridge device is different from the device identifier corresponding to the target routing bridge device identifier of the first data packet (that is, if the device identifier of the target border routing bridge device is BRB00), the first border routing bridge device sets the device identifier (such as BRB00) of the target border routing bridge device as the target routing bridge device identifier of the second data packet (that is, changes the device identifier of the border routing bridge device of the third area that corresponds to the target routing bridge device identifier of the first data packet to the device identifier of the target border routing bridge device, and optionally, sets the device identifier of the target border routing bridge device as the target routing bridge device identifier of second data packet by changing the target nickname of the first data packet) (in this case, the first data packet is different from the second data packet in target border routing bridge device identifier information and source border routing bridge device identifier information that correspond to the data packets, and all other portions are the same), and sends the second data packet that carries the device identifier of the target border routing bridge device to the target border routing bridge device. Therefore, according to a different source device and target device of each data packet, a suitable target border routing bridge device used to receive the data packet sent by the first border routing bridge device can be selected from the device identifier group of the third area, and the data packet can be sent to the target device of the data packet using the target border routing bridge device, thereby implementing per-flow load balancing.

In this embodiment of the present disclosure, when a first border routing bridge device of a first area sends a first data packet to a border routing bridge device of a third area, the first border routing bridge device determines a device identifier group of the third area according to the first data packet, where the first data packet includes a device identifier of the first border routing bridge device that is used as a source routing bridge device identifier, a device identifier of the border routing bridge device of the third area that is used as a target routing bridge device identifier, a device identifier of a source device, and a device identifier of a target device, and the device identifier group of the third area includes device identifiers of all border routing bridge devices of the third area. Further, the first border routing bridge device determines a device identifier of a target border routing bridge device of the third area from the device identifier group of the third area according to the first data packet, where the target border routing bridge device of the third area is used to receive a data packet sent by the first border routing bridge device. Further, the first border routing bridge device sends a second data packet that carries the device identifier of the target border routing bridge device to the target border routing bridge device, where the device identifier of the target border routing bridge device is used as a target routing bridge device identifier of the second data packet. Therefore, according to a different source device and target device of each data packet, a suitable target border routing bridge device used to receive the data packet sent by the first border routing bridge device can be selected from the device identifier group of the third area. In this way, per-flow load balancing is implemented.

Optionally, before step S401, the method further includes determining, in the first area, by the first border routing bridge device, at least one other border routing bridge device of the first area other than the first border routing bridge device, and forming a device identifier group of the first area according to device identifiers of all border routing bridge devices of the first area, where all the border routing bridge devices of the first area include the first border routing bridge device. Optionally, determining, in the first area, by the first border routing bridge device, at least one other border routing bridge device of the first area other than the first border routing bridge device includes determining, by the first border routing bridge device, the at least one other border routing bridge device of the first area respectively according to a respective device identifier sent by the at least one other border routing bridge device of the first area. A specific process is similar to the manner in which the first border routing bridge device determines, in the first area, at least one other border routing bridge device of the first area other than the first border routing bridge device in the foregoing embodiment of the present disclosure. Details are not described herein again.

Optionally, in this embodiment of the present disclosure, it is not limited that a border routing bridge device of the first area implements per-flow load balancing using the data packet transmission method in the foregoing embodiment of the present disclosure when the first border routing bridge device sends a data packet to a border routing bridge device of the third area. When the first border routing bridge device sends a data packet to a border routing bridge device of another area (such as a second area or a fourth area), the first border routing bridge device may also implement per-flow load balancing using the data packet transmission method in the foregoing embodiment of the present disclosure. Details are not described herein again.

Optionally, in the foregoing embodiment of the present disclosure, the border routing bridge devices of the first area are not limited to BRB3 and BRB30, and may further include at least one other border routing bridge device. Similarly, the border routing bridge devices of the third area are not limited to BRB0 and BRB00, and may further include at least one other border routing bridge device. Optionally, the L1 network not only includes the first area and the third area, but also may further include another area. When the L1 network further includes another area, any border routing bridge device in the other area may also use the data packet transmission method in the foregoing embodiment of the present disclosure. Details are not described herein again (in the present disclosure, the data packet transmission method of the present disclosure is described in detail using the first area and the third area as examples).

Optionally, the data packet transmission method in the foregoing embodiment of the present disclosure not only may be applied to a multilevel TRILL network, but also may be applied to protocol layering of another data center network, for example, layering of a Network Virtualization Over Layer 3 (NVO3) network or a Shortest Path Bridging (SPB) network.

Figure 5:
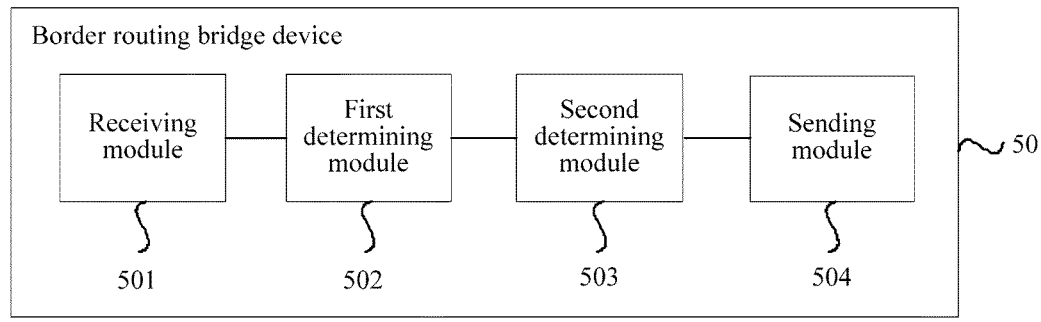
FIG. 5 is a schematic structural diagram of Embodiment 1 of a border routing bridge device according to an embodiment of the present disclosure.

FIG. 5 is a schematic structural diagram of Embodiment 1 of a border routing bridge device 50 according to an embodiment of the present disclosure. Optionally, the border routing bridge device 50 is a first border routing bridge device of a first area. As shown in FIG. 5, the border routing bridge device 50 provided in this embodiment may include a receiving module 501, a first determining module 502, a second determining module 503, and a sending module 504.

The receiving module 501 is configured to receive a first data packet sent by a border routing bridge device of a second area to the first area, where the first data packet includes a device identifier of the border routing bridge device of the second area that is used as a source routing bridge device identifier, a device identifier of the first border routing bridge device that is used as a target routing bridge device identifier, a device identifier of a source device, and a device identifier of a target device.

The first determining module 502 is configured to determine a device identifier group of the second area according to the first data packet, where the device identifier group of the second area includes device identifiers of all border routing bridge devices of the second area.

The second determining module 503 is configured to determine one device identifier from the device identifier group of the second area according to the first data packet, where a border routing bridge device, which is identified by the determined device identifier, of the second area is used to forward a return data packet sent by the target device to the source device.

The sending module 504 is configured to send a second data packet that carries the determined device identifier to the target device, where the determined device identifier is used as a source routing bridge device identifier of the second data packet.

Optionally, the second determining module 503 is further configured to set identifier information included in the first data packet as an input of a hash algorithm, and determine, from the device identifier group of the second area according to the hash algorithm, the device identifier corresponding to the border routing bridge device of the second area and that is used to forward the return data packet sent by the target device to the source device, where the identifier information includes at least one of the device identifier of the border routing bridge device of the second area, the device identifier of the first border routing bridge device, and the device identifier of the source device.

Optionally, the second determining module 503 is further configured to determine, from the device identifier group of the second area using a shortest path algorithm according to identifier information included in the first data packet, the device identifier corresponding to the border routing bridge device of the second area and that is used to forward the return data packet sent by the target device to the source device, where the identifier information includes at least one of the device identifier of the border routing bridge device of the second area, the device identifier of the first border routing bridge device, the device identifier of the source device, and the device identifier of the target device.

Optionally, the sending module 504 is further configured to determine that the determined device identifier is different from the device identifier corresponding to the source routing bridge device identifier of the first data packet, and set the determined device identifier as the source routing bridge device identifier of the second data packet, and send the second data packet that carries the determined device identifier to the target device.

Optionally, the border routing bridge device 50 further includes an obtaining module (not shown) configured to obtain a device identifier group of at least one area, where the device identifier group of each of the at least one area includes device identifiers of all border routing bridge devices of the area, and the second area is one of the at least one area.

Optionally, the obtaining module is further configured to obtain the device identifier group of the at least one area according to device identifier group information of each of the at least one area that is sent by a border routing bridge device of the area.

Optionally, the first determining module 502 is further configured to determine the device identifier group of the second area from the device identifier group of the at least one area according to information about the device identifier of the border routing bridge device of the second area that is included in the first data packet.

Optionally, the border routing bridge device 50 further includes a third determining module (not shown) configured to determine, in the first area, at least one other border routing bridge device of the first area other than the first border routing bridge device, and form a device identifier group of the first area according to device identifiers of all border routing bridge devices of the first area, where all the border routing bridge devices of the first area include the first border routing bridge device.

Optionally, the third determining module is further configured to determine the at least one other border routing bridge device of the first area respectively according to a respective device identifier sent by the at least one other border routing bridge device of the first area.

The border routing bridge device 50 in this embodiment may be used to perform the technical solutions in Embodiment 1 and Embodiment 2 of the foregoing data packet transmission method of the present disclosure. Their implementation principles and technical effects are similar. Details are not described herein again.

Figure 6:
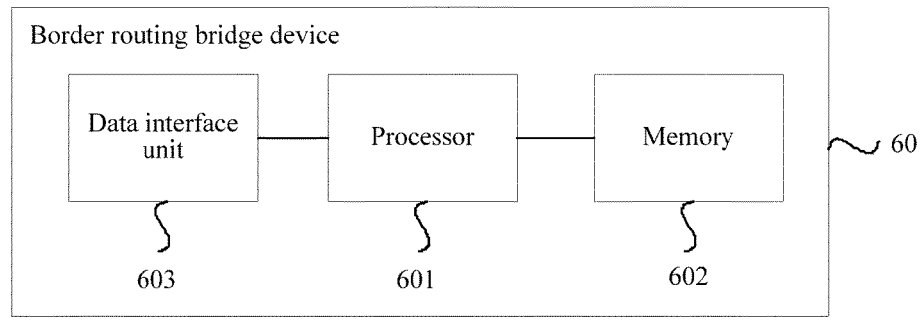
FIG. 6 is a schematic structural diagram of Embodiment 2 of a border routing bridge device according to an embodiment of the present disclosure.

FIG. 6 is a schematic structural diagram of Embodiment 2 of a border routing bridge device 60 according to an embodiment of the present disclosure. Optionally, the border routing bridge device 60 is a first border routing bridge device of a first area. As shown in FIG. 6, the border routing bridge device 60 provided in this embodiment may include a processor 601 and a memory 602. The border routing bridge device 60 may further include a data interface unit 603. The data interface unit 603 may be connected to the processor 601. The data interface unit 603 is configured to receive/send a data packet, and the memory 602 is configured to store executable instructions. When the border routing bridge device 60 runs, the processor 601 communicates with the memory 602, and the processor 601 invokes the executable instructions in the memory 602 to perform the operations in Embodiment 1 and Embodiment 2 of the foregoing data packet transmission method.

The border routing bridge device in this embodiment may be used to perform the technical solutions in Embodiment 1 and Embodiment 2 of the foregoing data packet transmission method of the present disclosure. Their implementation principles and technical effects are similar. Details are not described herein again.

Figure 7:
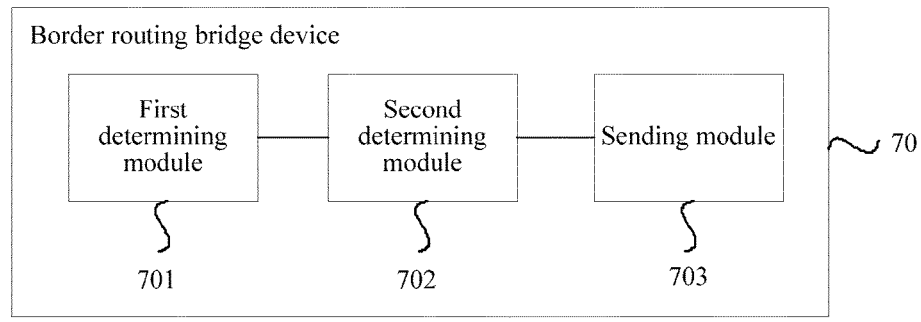
FIG. 7 is a schematic structural diagram of Embodiment 3 of a border routing bridge device according to an embodiment of the present disclosure.

FIG. 7 is a schematic structural diagram of Embodiment 3 of a border routing bridge device 70 according to an embodiment of the present disclosure. Optionally, the border routing bridge device 70 is a first border routing bridge device of a first area. As shown in FIG. 7, the border routing bridge device 70 provided in this embodiment may include a first determining module 701, a second determining module 702, and a sending module 703.

The first determining module 701 is configured to determine a device identifier group of the third area according to the first data packet when the first border routing bridge device of the first area sends a first data packet to a border routing bridge device of a third area, where the first data packet includes a device identifier of the first border routing bridge device that is used as a source routing bridge device identifier, a device identifier of the border routing bridge device of the third area that is used as a target routing bridge device identifier, a device identifier of a source device, and a device identifier of a target device, and the device identifier group of the third area includes device identifiers of all border routing bridge devices of the third area.

The second determining module 702 is configured to determine a device identifier of a target border routing bridge device of the third area from the device identifier group of the third area according to the first data packet, where the target border routing bridge device of the third area is used to receive a data packet sent by the first border routing bridge device.

The sending module 703 is configured to send a second data packet that carries the device identifier of the target border routing bridge device to the target border routing bridge device, where the device identifier of the target border routing bridge device is used as a target routing bridge device identifier of the second data packet.

Optionally, the second determining module 702 is further configured to set identifier information included in the first data packet as an input of a hash algorithm, and determine the device identifier of the target border routing bridge device of the third area from the device identifier group of the third area according to the hash algorithm, where the identifier information includes at least one of the device identifier of the first border routing bridge device, the device identifier of the border routing bridge device of the third area, the device identifier of the source device, and the device identifier of the target device.

Optionally, the second determining module 702 is further configured to determine the device identifier of the target border routing bridge device of the third area from the device identifier group of the third area using a shortest path algorithm according to identifier information included in the first data packet, where the identifier information includes at least one of the device identifier of the first border routing bridge device, the device identifier of the border routing bridge device of the third area, the device identifier of the source device, and the device identifier of the target device.

Optionally, the sending module 703 is further configured to determine that the device identifier of the target border routing bridge device is different from the device identifier corresponding to the target routing bridge device identifier of the data packet, and set the device identifier of the target border routing bridge device as the target routing bridge device identifier of the second data packet, and send the second data packet that carries the device identifier of the target border routing bridge device to the target border routing bridge device.

Optionally, the border routing bridge device 70 further includes an obtaining module (not shown) configured to obtain a device identifier group of at least one area, where the device identifier group of each of the at least one area includes device identifiers of all border routing bridge devices of the area, and the third area is one of the at least one area.

Optionally, the obtaining module is further configured to obtain the device identifier group of the at least one area according to device identifier group information of each of the at least one area that is sent by a border routing bridge device of the area.

Optionally, the first determining module 701 is further configured to determine, the device identifier group of the third area from the device identifier group of the at least one area according to information about the device identifier of the border routing bridge device of the third area that is included in the first data packet.

Optionally, the border routing bridge device 70 further includes a third determining module (not shown) configured to determine, in the first area, at least one other border routing bridge device of the first area other than the first border routing bridge device, and form a device identifier group of the first area according to device identifiers of all border routing bridge devices of the first area, where all the border routing bridge devices of the first area include the first border routing bridge device.

Optionally, the third determining module is further configured to determine the at least one other border routing bridge device of the first area respectively according to a respective device identifier sent by the at least one other border routing bridge device of the first area.

The border routing bridge device in this embodiment may be used to perform the technical solution in Embodiment 3 of the foregoing data packet transmission method of the present disclosure. Their implementation principles and technical effects are similar. Details are not described herein again.

Figure 8:
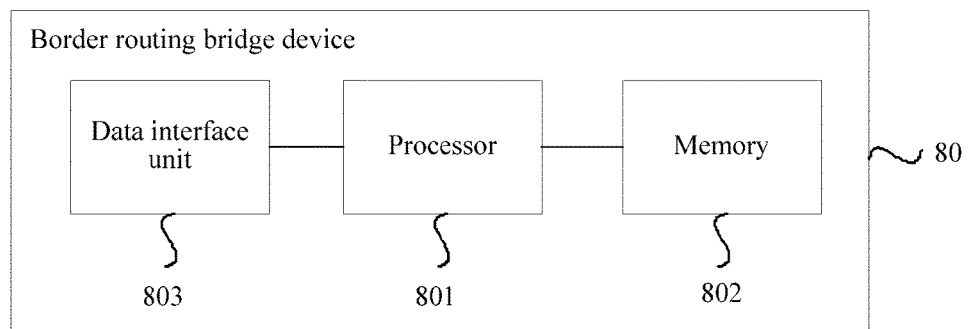
FIG. 8 is a schematic structural diagram of Embodiment 4 of a border routing bridge device according to an embodiment of the present disclosure.

FIG. 8 is a schematic structural diagram of Embodiment 4 of a border routing bridge device 80 according to an embodiment of the present disclosure. Optionally, the border routing bridge device 80 is a first border routing bridge device of a first area. As shown in FIG. 8, the border routing bridge device 80 provided in this embodiment may include a processor 801 and a memory 802. The border routing bridge device 80 may further include a data interface unit 803. The data interface unit 803 may be connected to the processor 801. The data interface unit 803 is configured to receive/send a data packet, and the memory 802 is configured to store executable instructions. When the border routing bridge device 80 runs, the processor 801 communicates with the memory 802, and the processor 801 invokes the executable instructions in the memory 802 to perform the operations in Embodiment 3 of the foregoing data packet transmission method.

The border routing bridge device 80 in this embodiment may be used to perform the technical solution in Embodiment 3 of the foregoing data packet transmission method of the present disclosure. Their implementation principles and technical effects are similar. Details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:
1. A data packet transmission method, comprising:
receiving, by a first border routing bridge device of a first area, a first data packet from a border routing bridge device of a second area to the first area, wherein the first data packet comprises a device identifier of the border routing bridge device of the second area that is used as a source routing bridge device identifier, a device identifier of the first border routing bridge device that is used as a target routing bridge device identifier, a device identifier of a source device, and a device identifier of a target device;

determining, by the first border routing bridge device, a device identifier group of the second area according to the first data packet, wherein the device identifier group of the second area comprises device identifiers of border routing bridge devices of the second area;

determining, by the first border routing bridge device, one device identifier from the device identifier group of the second area according to the first data packet, wherein a border routing bridge device, which is identified by the determined device identifier, of the second area forwards a return data packet from the target device to the source device; and sending, by the first border routing bridge device, a second data packet carrying the determined device identifier to the target device, wherein the determined device identifier is used as a source routing bridge device identifier of the second data packet.

2. The method according to claim 1, wherein determining one device identifier from the device identifier group of the second area comprises:

setting, by the first border routing bridge device, identifier information comprised in the first data packet as an input of a hash algorithm; and determining, from the device identifier group of the second area according to the hash algorithm, the device identifier corresponding to the border routing bridge device of the second area to forward the return data packet from the target device to the source device, and wherein the identifier information comprises at least one of the device identifier of the border routing bridge device of the second area, the device identifier of the first border routing bridge device, and the device identifier of the source device.

3. The method according to claim 1, wherein determining one device identifier from the device identifier group of the second area comprises determining, by the first border routing bridge device from the device identifier group of the second area using a shortest path algorithm according to identifier information comprised in the first data packet, the device identifier corresponding to the border routing bridge device of the second area to forward the return data packet from the target device to the source device, and wherein the identifier information comprises at least one of the device identifier of the border routing bridge device of the second area, the device identifier of the first border routing bridge device, the device identifier of the source device, and the device identifier of the target device.

4. The method according to claim 1, wherein sending the second data packet comprises:

determining, by the first border routing bridge device, that the determined device identifier is different from the device identifier corresponding to the source routing bridge device identifier of the first data packet;

setting, by the first border routing bridge device, the determined device identifier as the source routing bridge device identifier of the second data packet; and sending, by the first border routing bridge device, the second data packet carrying the determined device identifier to the target device.

5. The method according to claim 1, wherein before determining the device identifier group of the second area, the method further comprises obtaining, by the first border routing bridge device, a device identifier group of at least one area, wherein the device identifier group of each of the at least one area comprises device identifiers of border routing bridge devices of each corresponding area, and wherein the second area is one of the at least one area.

6. The method according to claim 5, wherein obtaining the device identifier group of at least one area comprises obtaining, by the first border routing bridge device, the device identifier group of the at least one area according to device identifier group information of each of the at least one area from a border routing bridge device of the each corresponding area.

7. A data packet transmission method, comprising:

determining, by a first border routing bridge device, a device identifier group of a third area according to a first data packet when the first border routing bridge device of a first area sends the first data packet to a border routing bridge device of the third area, wherein the first data packet comprises a device identifier of the first border routing bridge device that is used as a source routing bridge device identifier, a device identifier of the border routing bridge device of the third area that is used as a target routing bridge device identifier, a device identifier of a source device, and a device identifier of a target device, and wherein the device identifier group of the third area comprises device identifiers of border routing bridge devices of the third area;

determining, by the first border routing bridge device, a device identifier of a target border routing bridge device of the third area from the device identifier group of the third area according to the first data packet, wherein the target border routing bridge device of the third area receives a data packet from the first border routing bridge device; and sending, by the first border routing bridge device, a second data packet carrying the device identifier of the target border routing bridge device to the target border routing bridge device, wherein the device identifier of the target border routing bridge device is used as a target routing bridge device identifier of the second data packet.

8. The method according to claim 7, wherein determining the device identifier of the target border routing bridge device of the third comprises:

setting, by the first border routing bridge device, identifier information comprised in the first data packet as an input of a hash algorithm; and determining the device identifier of the target border routing bridge device of the third area from the device identifier group of the third area according to the hash algorithm, and wherein the identifier information comprises at least one of the device identifier of the first border routing bridge device, the device identifier of the border routing bridge device of the third area, the device identifier of the source device, and the device identifier of the target device.

9. The method according to claim 7, wherein determining the device identifier of the target border routing bridge device of the third area comprises determining, by the first border routing bridge device, the device identifier of the target border routing bridge device of the third area from the device identifier group of the third area using a shortest path algorithm according to identifier information included in the first data packet, and wherein the identifier information comprises at least one of the device identifier of the first border routing bridge device, the device identifier of the border routing bridge device of the third area, the device identifier of the source device, and the device identifier of the target device.

10. The method according to claim 7, wherein sending the second data packet to the target border routing bridge device comprises:
   determining, by the first border routing bridge device, that the device identifier of the target border routing bridge device is different from the device identifier corresponding to the target routing bridge device identifier of the first data packet;
   setting, by the first border routing bridge device, the device identifier of the target border routing bridge device as the target routing bridge device identifier of the second data packet; and
   sending the second data packet carrying the device identifier of the target border routing bridge device to the target border routing bridge device.

11. The method according to claim 7, wherein before determining the device identifier group of the third area, the method further comprises obtaining, by the first border routing bridge device, a device identifier group of at least one area, wherein the device identifier group of each of the at least one area comprises device identifiers of border routing bridge devices of each corresponding area, and wherein the third area is one of the at least one area.

12. The method according to claim 11, wherein obtaining the device identifier group of at least one area comprises obtaining, by the first border routing bridge device, the device identifier group of the at least one area according to device identifier group information of each of the at least one area from a border routing bridge device of the each corresponding area.

13. A border routing bridge device, wherein the border routing bridge device is a first border routing bridge device of a first area, and wherein the border routing bridge device comprises:
   a memory comprising instructions;
   a processor coupled to the memory and configured to execute the instructions;
   a transmitter coupled to the processor; and
   a receiver coupled to the processor,
   wherein the receiver is configured to receive a first data packet from a border routing bridge device of a second area to the first area,
   wherein the first data packet comprises a device identifier of the border routing bridge device of the second area that is used as a source routing bridge device identifier, a device identifier of the first border routing bridge device that is used as a target routing bridge device identifier, a device identifier of a source device, and a device identifier of a target device,
   wherein the processor is configured to:
      determine a device identifier group of the second area according to the first data packet, wherein the device identifier group of the second area comprises device identifiers of border routing bridge devices of the second area; and
      determine one device identifier from the device identifier group of the second area according to the first data packet, wherein a border routing bridge device, which is identified by the determined device identifier, of the second area forwards a return data packet from the target device to the source device,
   wherein the transmitter is configured to send a second data packet carrying the determined device identifier to the target device, and
   wherein the determined device identifier is used as a source routing bridge device identifier of the second data packet.

14. The border routing bridge device according to claim 13, wherein the processor is further configured to:
   set identifier information comprised in the first data packet as an input of a hash algorithm; and
   determine, from the device identifier group of the second area according to the hash algorithm, the device identifier corresponding to the border routing bridge device of the second area to forward the return data packet from the target device to the source device, and
   wherein the identifier information comprises at least one of the device identifier of the border routing bridge device of the second area, the device identifier of the first border routing bridge device, and the device identifier of the source device.

15. The border routing bridge device according to claim 13, wherein the processor is further configured to determine, from the device identifier group of the second area using a shortest path algorithm according to identifier information comprised in the first data packet, the device identifier corresponding to the border routing bridge device of the second area to forward the return data packet from the target device to the source device, and wherein the identifier information comprises at least one of the device identifier of the border routing bridge device of the second area, the device identifier of the first border routing bridge device, the device identifier of the source device, and the device identifier of the target device.

16. The border routing bridge device according to claim 13, wherein the transmitter is further configured to:
   determine that the determined device identifier is different from the device identifier corresponding to the source routing bridge device identifier of the first data packet;
   set the determined device identifier as the source routing bridge device identifier of the second data packet; and
   send the second data packet carrying the determined device identifier to the target device.

17. The border routing bridge device according to claim 13, wherein the processor is further configured to obtain a device identifier group of at least one area, wherein the device identifier group of each of the at least one area comprises device identifiers of border routing bridge devices of each corresponding area, and wherein the second area is one of the at least one area.

18. A border routing bridge device, wherein the border routing bridge device is a first border routing bridge device of a first area, and wherein the border routing bridge device comprises:
   a memory comprising instructions;
   a processor coupled to the memory and configured to execute the instructions; and
   a transmitter coupled to the processor,
   wherein the processor is configured to:
      determine a device identifier group of a third area according to a first data packet when the first border routing bridge device of the first area sends the first data packet to a border routing bridge device of the third area, wherein the first data packet comprises a device identifier of the first border routing bridge device that is used as a source routing bridge device identifier, a device identifier of the border routing bridge device of the third area that is used as a target routing bridge device identifier, a device identifier of a source device, and a device identifier of a target device, and wherein the device identifier group of the third area comprises device identifiers of border routing bridge devices of the third area; and determine a device identifier of a target border routing bridge device of the third area from the device identifier group of the third area according to the first data packet, wherein the target border routing bridge device of the third area receives a data packet from the first border routing bridge device, wherein the transmitter is configured to send a second data packet carrying the device identifier of the target border routing bridge device to the target border routing bridge device, and wherein the device identifier of the target border routing bridge device is used as a target routing bridge device identifier of the second data packet.

19. The border routing bridge device according to claim 18, wherein the processor is further configured to:

set identifier information comprised in the first data packet as an input of a hash algorithm; and determine the device identifier of the target border routing bridge device of the third area from the device identifier group of the third area according to the hash algorithm, and wherein the identifier information comprises at least one of the device identifier of the first border routing bridge device, the device identifier of the border routing bridge device of the third area, the device identifier of the source device, and the device identifier of the target device.

20. The border routing bridge device according to claim 18, wherein the processor is further configured to determine the device identifier of the target border routing bridge device of the third area from the device identifier group of the third area using a shortest path algorithm according to identifier information included in the first data packet, and wherein the identifier information comprises at least one of the device identifier of the first border routing bridge device, the device identifier of the border routing bridge device of the third area, the device identifier of the source device, and the device identifier of the target device.

* * * * *

UNITED STATES PATENT AND TRADEMARK OFFICE
CERTIFICATE OF CORRECTION

PATENT NO. : 10,305,806 B2
APPLICATION NO. : 15/699519
DATED : May 28, 2019
INVENTOR(S) : Mingui Zhang Page 1 of 1

It is certified that error appears in the above-identified patent and that said Letters Patent is hereby corrected as shown below:

On the Title Page

(73) Assignee, Delete "HUAWEI TECHNOLOGIES., LTD.," and insert --HUAWEI TECHNOLOGIES CO., LTD.,--

(74) Attorney, Agent, or Firm, Delete "Conley Rose P.C." and insert --Conley Rose, P.C.--

Page 2, Second Column, Lines 6-8, should read:
Zhang, M., et al., "Single Area Border RBridge Nickname for TRILL Multilevel," draft-ietf-trill-multilevel-single-nickname-00.txt, Aug. 20, 2015, 11 pages.

In the Claims

Column 32, Claim 8, Line 44, should read:
device of the third area comprises:

Signed and Sealed this
Twenty-third Day of July, 2019

Andrei Iancu
*Director of the United States Patent and Trademark Office*